US011811738B2

(12) United States Patent
Curry et al.

(10) Patent No.: US 11,811,738 B2
(45) Date of Patent: Nov. 7, 2023

(54) UNIDIRECTIONAL GATEWAY MEDIATED MULTIPLEXING OF CONCURRENT DATA MESSAGE STREAMS

(71) Applicant: OPSWAT Inc., Tampa, FL (US)

(72) Inventors: John Curry, New River, AZ (US); Tzvetan Chaliavski, Arlington, VA (US); Cosmin Banciu, Raleigh, NC (US)

(73) Assignee: OPSWAT Inc., Tampa, FL (US)

( * ) Notice: Subject to any disclaimer, the term of this patent is extended or adjusted under 35 U.S.C. 154(b) by 0 days.

(21) Appl. No.: 17/651,387

(22) Filed: Feb. 16, 2022

(65) Prior Publication Data
US 2022/0174047 A1    Jun. 2, 2022

Related U.S. Application Data

(63) Continuation-in-part of application No. PCT/US2021/034815, filed on May 28, 2021.
(Continued)

(51) Int. Cl.
*H04L 9/40* (2022.01)
*H04L 1/1607* (2023.01)
(Continued)

(52) U.S. Cl.
CPC .......... *H04L 63/0281* (2013.01); *G06F 21/53* (2013.01); *H04L 1/1621* (2013.01);
(Continued)

(58) Field of Classification Search
CPC ... H04L 63/0281; H04L 1/1621; H04L 12/46; H04L 63/0209; H04L 63/105;
(Continued)

(56) References Cited

U.S. PATENT DOCUMENTS 9,819,679 B1 * 11/2017 Bertz ................... H04W 12/06
2010/0115027 A1 * 5/2010 Ryu ...................... H04L 67/75
709/229
(Continued)

OTHER PUBLICATIONS

"User-Level Network Interface Protocols"; Bhoedjang et al.; Computer ( vol. 31, Issue: 11, Nov. 1998) (Year: 1998).*
International Search Report and Written Opinion dated Nov. 2, 2021 for PCT Patent Application No. PCT/US2021/034725.
International Search Report and Written Opinion dated Oct. 4, 2021 for PCT Patent Application No. PCT/US2021/034815.

*Primary Examiner* — Benjamin H Elliott, IV
(74) *Attorney, Agent, or Firm* — MLO, a professional corp.

(57) ABSTRACT

A method includes a processor in a trusted domain receiving a first request having a plurality of messages for a device in an untrusted domain. The processor assigns a memory location having data segments and status segments. The memory location is accessible by an untrusted side interface card. The processor transmits a first message to a first data segment. The processor receives a first value associated with the first message from a first status segment. The processor determines whether the first value indicates that the first message has been received and stores a first representation of a successful data transmission. The processor transmits a second message to a second data segment. The processor retrieves a second value from the second status segment. The processor determines whether the second value indicates that the second message has been received and stores a second representation of the successful data transmission.

20 Claims, 8 Drawing Sheets

Related U.S. Application Data

(60) Provisional application No. 63/032,966, filed on Jun. 1, 2020.

(51) Int. Cl.
 *H04L 12/46* (2006.01)
 *G06F 21/53* (2013.01)

(52) U.S. Cl.
 CPC .......... *H04L 12/46* (2013.01); *H04L 63/0209* (2013.01); *H04L 63/105* (2013.01); *G06F 2221/034* (2013.01)

(58) Field of Classification Search
 CPC . H04L 63/0428; H04L 63/0823; H04L 63/10; H04L 63/08; H04L 63/20; H04L 29/06; H04L 29/14; G06F 21/6218; G06F 3/061; G06F 21/64; G06F 21/62; G06F 21/54; G06F 21/57
 See application file for complete search history.

(56) References Cited

U.S. PATENT DOCUMENTS

| | | | |
|---|---|---|---|
| 2010/0169392 A1* | 7/2010 | Lev Ran | G06F 16/1774 707/827 |
| 2013/0067023 A1* | 3/2013 | Joy | H04L 63/0421 709/217 |
| 2015/0067104 A1* | 3/2015 | Curry | H04L 63/0209 709/218 |
| 2015/0074767 A1* | 3/2015 | Clark | H04L 63/10 726/4 |
| 2016/0034702 A1* | 2/2016 | Sikka | G06F 21/602 726/27 |
| 2016/0306995 A1* | 10/2016 | Arasu | G06F 21/6227 |
| 2019/0005254 A1* | 1/2019 | Arasu | G06F 21/6227 |
| 2019/0095488 A1* | 3/2019 | Bhattacharjee | G06F 16/951 |
| 2019/0173919 A1* | 6/2019 | Irimie | H04L 63/1483 |
| 2022/0174047 A1* | 6/2022 | Curry | H04L 63/0281 |

* cited by examiner

UNIDIRECTIONAL GATEWAY MEDIATED MULTIPLEXING OF CONCURRENT DATA MESSAGE STREAMS

CROSS-REFERENCE TO RELATED APPLICATIONS

This patent application is a continuation-in-part of PCT Patent Application PCT/US2021/034815 filed May 28, 2021, titled "Unidirectional Gateway Mediated Multiplexing of Concurrent Data Message Streams", which claims priority to and benefit of U.S. Provisional Application No. 63/032,966, titled "Unidirectional Gateway Mediated Multiplexing of Concurrent Data Message Streams," filed Jun. 1, 2020, which are incorporated by reference herein.

FIELD

The present disclosure relates to the unidirectional delivery of data messages and confirmation of successful delivery of the data messages.

BACKGROUND

A unidirectional gateway is a network appliance or device that allows data to travel in only one direction.

SUMMARY

In some embodiments, a method includes a processor in a trusted domain receiving a first request having a plurality of messages for a compute device in an untrusted domain. The processor assigns a memory location having a plurality of data segments and a plurality of status segments associated with each message of the plurality of messages. The memory location is accessible by an untrusted side network interface card of the compute device in the untrusted domain. The processor transmits a first message of the plurality of messages to a first data segment of the plurality of data segments of the memory location. The processor retrieves a first value associated with the first message of the plurality of messages from a first status segment of the plurality of status segments of the memory location. The processor determines whether the first value indicates that the first message has been received in the first data segment of the plurality of data segments of the memory location. The processor stores a first representation of a successful data transmission when the first value indicates that the first message has been received in the first data segment of the plurality of data segments of the memory location. The processor transmits a second message of the plurality of messages to a second data segment of the plurality of data segments of the memory location. The processor retrieves a second value associated with the second message of the plurality of messages from the second status segment of the plurality of status segments of the memory location. The processor determines whether the second value indicates that the second message has been received in the second data segment of the plurality of data segments of the memory location. The processor stores a second representation of the successful data transmission when the second value indicates that the second message has been received in the second data segment of the plurality of data segments of the memory location.

In some embodiments, a method includes receiving by a processor in a trusted domain, a plurality of requests. Each request has a plurality of messages for a compute device in an untrusted domain. The processor assigns a memory location of a plurality of memory locations for each request of the plurality of requests. Each memory location of the plurality of memory locations has a plurality of data segments and a plurality of status segments associated with each message of the plurality of messages. Each memory location of the plurality memory locations is accessible by an untrusted side network interface card of the compute device in the untrusted domain. The processor transmits a first message of the plurality of messages for each request of the plurality of requests to a first data segment of the plurality of data segments of the memory location domain. The processor retrieves a first value associated with the first message of the plurality of messages from a first status segment of the plurality of status segments of the memory location for each request of the plurality of requests. The processor determines whether the first value indicates that the first message of the plurality of messages has been received in the first data segment of the plurality of data segments of the memory location for each request of the plurality of requests. The processor stores a first representation of a successful data transmission when the first value indicates that the first message of the plurality of messages has been received in the first data segment of the plurality of data segments of the memory location for each request of the plurality of requests. The processor transmits a second message of the plurality of messages for each request of the plurality of requests to a second data segment of the plurality of data segments of the memory location. The processor retrieves a second value associated with the second message of the plurality of messages from the second status segment of the plurality of status segments of the memory location for each request of the plurality of requests. The processor determines whether the second value indicates that the second message of the plurality of messages has been received in the second data segment of the plurality of data segments of the memory location for each request of the plurality of requests. The processor stores a second representation of the successful data transmission when the second value indicates that the second message of the plurality of messages has been received in the second data segment of the plurality of data segments of the memory location for each request of the plurality of requests.

DETAILED DESCRIPTION

Figure 1:
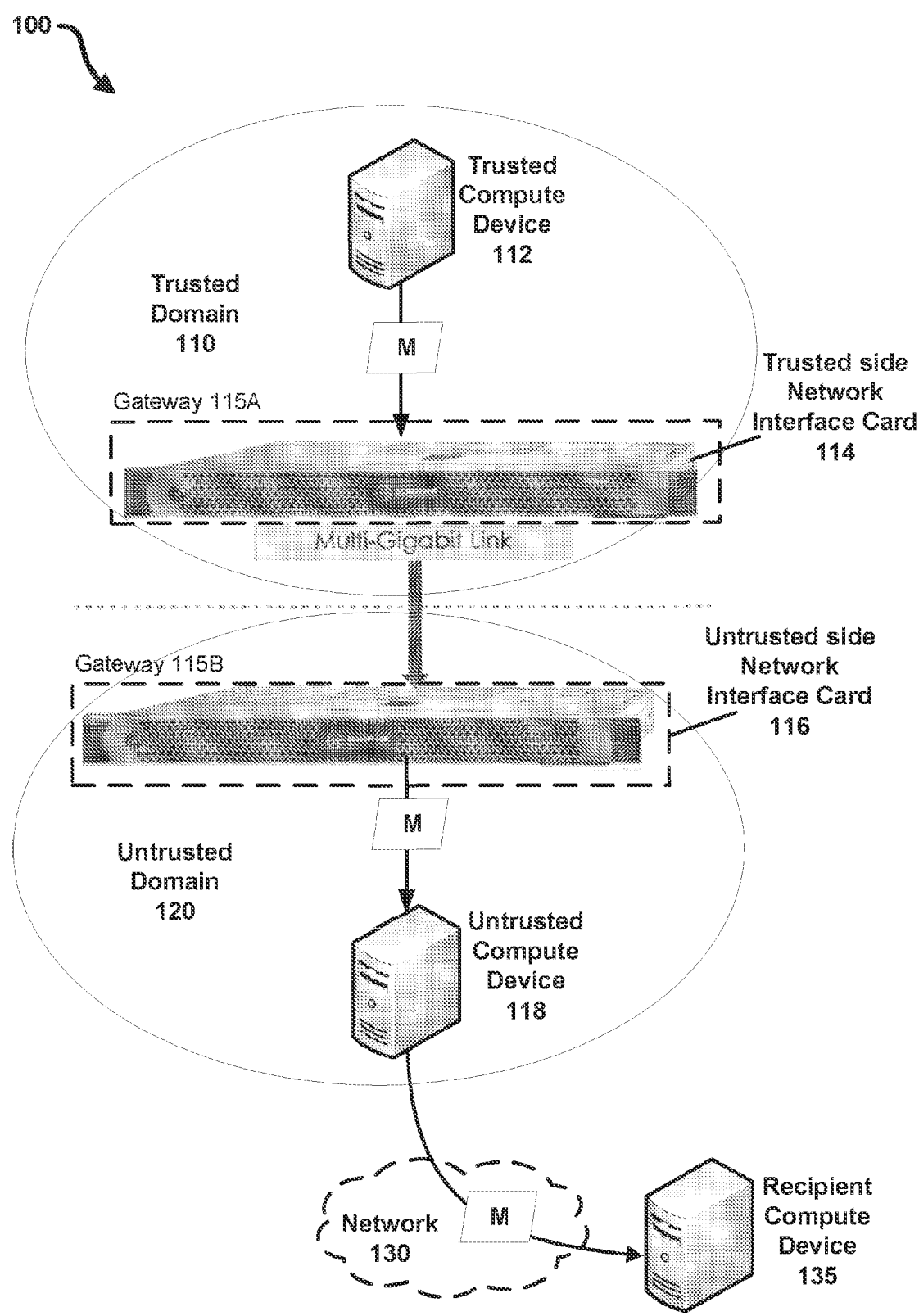
FIG. 1 is a diagram of a system for unidirectional gateway mediated delivery of data messages, according to some embodiments.

Embodiments of the present disclosure can be used in the application of a unidirectional data gateway, as deployed, for example, in a typical transmission control protocol/Internet protocol (TCP/IP) network. An example use case includes the use of two separate domains—one trusted domain, and one untrusted domain. Data can be permitted to pass from the trusted domain (or "trusted side") to the untrusted domain (or "untrusted side"), while network access and/or data flow from the untrusted domain to the trusted domain is not possible (i.e., unidirectional) because no mechanism exists for network transport or data transfer of any kind from the untrusted domain to the trusted domain. In other words, data exchange in a unidirectional data gateway is, by default, only possible from the trusted side to the untrusted side, and never in reverse. Stated another way, no networking signals or content can be received at the trusted side from the untrusted side.

A data diode is a communication device that facilitates secure, one-way transfers of data between segmented networks. Hardware-based data diodes, for example, can ensure unidirectional data flow by making it physically impossible for the trusted side to receive data from the untrusted side. In such implementations, the untrusted side has a "receive" capability (but not a "send" capability) in its network interface, while the trusted side has a "send" capability (but not a "receive" capability).

Known data diodes share several common features. First, data diodes impose physical isolation, in that communication is only physically possible in one direction: from the trusted domain to the untrusted domain. This is typically enforced using a single strand of fiber with a transmitter at one end and a receiver at the other end. Second, data diodes transmit data flow without confirmation. In other words, the transmitting side of a data diode does not "know" (e.g., does not receive a reply or confirmation message) whether the transmitted data arrived at the receiving side, as there is no return path of any type since it has a unidirectional flow. Third, the physical isolation of a data diode is typically accomplished using a complex software environment to manage the one-way data exchanges. Fourth, data transmissions via known data diodes include a protocol "break," such that there is no full networking handshake between the two domains. The protocol break occurs when a compute device on the trusted-side terminates an incoming network request and, after some amount of signaling and data transfer to a compute device of the untrusted side, an equivalent network connection is built by the compute device of the untrusted-side, for final delivery to the intended destination.

As described herein, known data diodes lack an ability to confirm successful receipt of data at the untrusted side (i.e., no "guaranteed delivery"). In other words, the trusted side can only send data out; there is no mechanism by which the trusted side can determine whether or not the data was successfully received at the untrusted side. As such, the compute device of the untrusted side typically re-transmits each message multiple times, resulting in lower overall throughput and computational efficiency due to re-transmission overhead. Known data diodes also have a limited ability to support multiple concurrent data streams (e.g., from more than one distinct source on the trusted side, to one or more destinations on the untrusted side) without consuming further computational and transmission overhead, and for fear of data overrun.

Systems and methods set forth herein overcome the aforementioned shortcomings of known data diodes by employing two compute devices connected to one another using a Peripheral Component Interconnect Express (PCIe) data link. One of the compute devices is connected to a network in a trusted domain, and the other compute device is connected to the same or a different network in an untrusted domain. The data link between the two compute devices is not a network connection, but rather uses a non-routable schema (optionally implemented in hardware) as a communications topology, thereby completely eliminating the possibility of any network connection between the two compute devices and guaranteeing full isolation of the trusted domain from the untrusted domain. The trusted domain and the untrusted domain may reside in a common network or may reside in different networks. The trusted domain and the untrusted domain are bridged without introducing a routable network connection.

In some embodiments, systems and methods guarantee data delivery via a unidirectional data gateway by initiating a unidirectional non-networked connection between a pair of network interface cards, with each network interface card from the pair of interface cards installed in a corresponding side or portion of a data delivery platform (a "trusted" portion and an "untrusted" portion). One network interface card from the pair of interface cards is associated with a trusted domain ("trusted side network interface card"), and the other interface card from the pair of interface cards is associated with an untrusted domain ("untrusted side network interface card"). The interface cards, in turn, are physically connected to one another (e.g., via a serial cable). A communications protocol of the data delivery platform can use the interface cards as a physical transport medium.

For example, the trusted side network interface card transmits an encoded data block to the untrusted side network interface card by the data delivery platform. Once received, the untrusted side network interface card writes that data block to a first fixed memory segment (memory data segment "A") on the untrusted portion of the data delivery platform. Software on the untrusted portion of the data delivery platform detects the arrival of the data block and retrieves it from memory data segment A. The software on the untrusted side of the data delivery platform verifies the integrity of the incoming data using a series of validity checks of the communications protocol of the data delivery platform. The result of the validity check, or value, is written to a second fixed memory segment (memory status segment "B") on the untrusted portion of the data delivery platform. A compute device of the trusted portion of the data delivery platform retrieves from the second fixed memory segment, memory status segment B, and determines whether the previous transmission was successful based on the value.

Stated another way, in some embodiments, the trusted side network interface card delivers data to a memory location on the untrusted side network interface card, and software on the untrusted portion of the data delivery platform detects the arrival of the data at the untrusted portion of the data delivery platform and retrieves it from the untrusted portion of the data delivery platform. Concurrently, or at least partially overlapping in time, software on the untrusted portion of the data delivery platform calculates a checksum or determines a value (e.g., status) for the incoming data and writes the value to a known memory location on the untrusted side network interface card. The trusted side network interface card includes a representation of that known memory location and reads and retrieves the value that has been written to the untrusted side network interface card. The trusted side network interface card then determines if the incoming data was received based on the value. In some embodiments, the trusted side network interface card compares that retrieved value to a predetermined benchmark value. If the retrieved value matches predetermined benchmark value, the data was received correctly. Hence, delivery is guaranteed without a network connection and without a control signal or data being sent from the untrusted side directly to the trusted side.

In some embodiments, a transmission status is not written directly to the trusted portion of the data delivery platform (e.g., the trusted side network interface card), but instead, is written to the untrusted portion of the data delivery platform. There is no mechanism by which the untrusted portion of the data delivery platform can write directly to the trusted portion of the data delivery platform, thus enforcing the unidirectional nature of the system.

In some embodiments, multiplexing of multiple concurrent data message streams is performed, using a unidirectional gateway, by assigning and supporting multiple concurrent shared memory locations, and programmatically tracking (e.g., using a state table) which memory location corresponds to which ongoing transmission from a trusted side to an untrusted side of a unidirectional gateway of a data delivery platform. Because there is a strict state table of those memory locations, the trusted side can interrogate all or a subset of the memory locations in rapid succession and sustain all assigned concurrent connections, because each data component of any given connection—even if it is moved serially between the two interface cards—is tagged with metadata sufficient to define which state it is associated with. As long as the state for any given connection is not closed, the interleaving of data components can be multiplexed across the serial connection, in any order, with any variable priority, and yet still be fully reconstructed on the other side.

FIG. 1 is a diagram of a system for unidirectional gateway mediated delivery of data messages, according to some embodiments. As shown in FIG. 1, a data delivery platform 100 includes a trusted domain 110 and an untrusted domain 120. Included within the trusted domain 110 are a trusted compute device 112 and a trusted side network interface card 114. Included within the untrusted domain 120 is an untrusted compute device 118 and an untrusted side network interface card 116 (also called remote network interface card). The trusted side network interface card 114 can be included in a gateway 115A. Alternatively, the trusted side network interface card 114 can be included as part of the trusted compute device 112. Similarly, the untrusted side network interface card 116 can be included in a gateway 115B. Alternatively, the untrusted side network interface card 116 can be included as part of the untrusted compute device 118. In some embodiments, the gateway 115A and the gateway 115B are combined as a single gateway that includes one or both of the trusted side network interface card 114 and the untrusted side network interface card 116.

In some embodiments, the system 100 is a unidirectional data gateway by a non-networked connection between compute devices which are directly physically connected with only a single cable therebetween. The direct cable connection between the compute devices in the trusted domain and the untrusted domain such as between processors, network interface cards or a combination thereof, is a non-networked connection. The direct cable connection also allows for an adapter (if needed) to be attached at either end of the cable, so that the cable can be attached to a port for the processor and/or a port for the interface card (see FIG. 2A, input ports 240 or output ports 242; and FIG. 2B, input ports 240 or output ports 242). During operation, the trusted compute device 112 (optionally in response to a received request to transmit a message "M" to the destination recipient compute device 135) sends a signal encoding a message to the trusted side network interface card 114 for delivery. A multi-gigabit link (or other appropriate link) may be present between the trusted side network interface card 114 and the untrusted side network interface card 116.

Figure 2A:
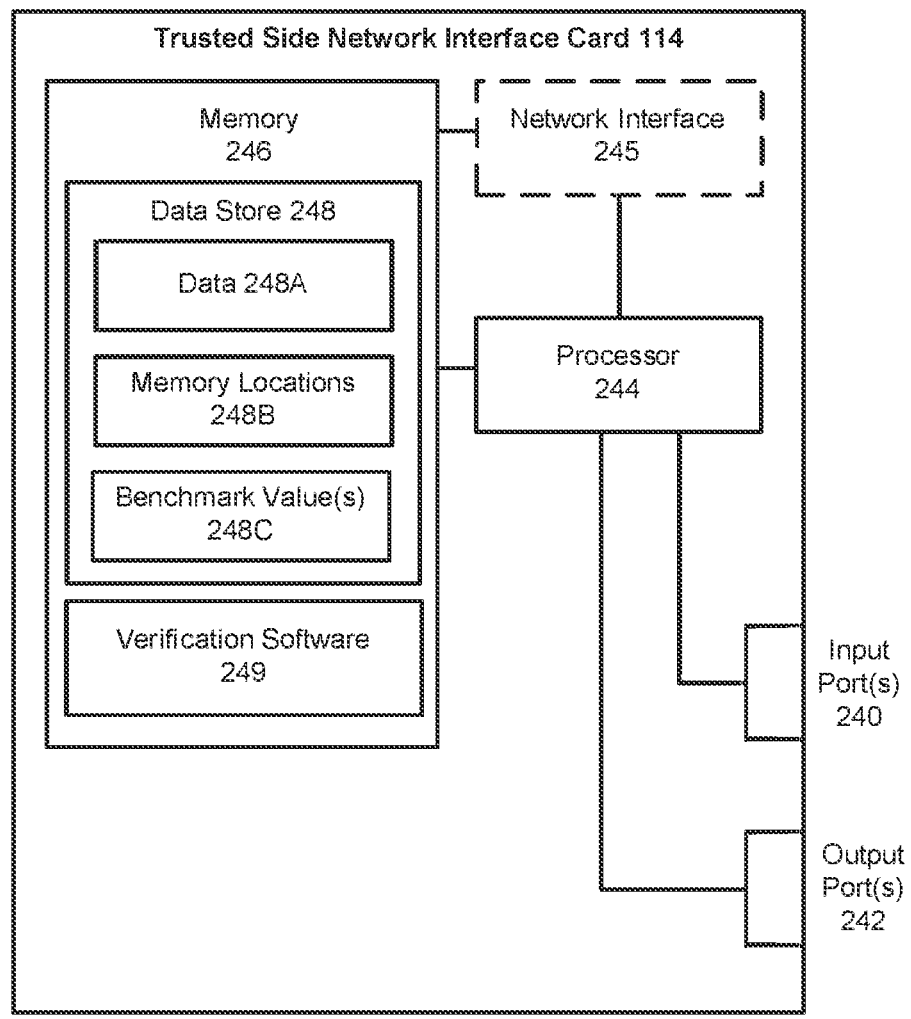
FIG. 2A is a block diagram of a trusted side network interface card of a data delivery platform, according to some embodiments.

FIG. 2A is a block diagram of a trusted side network interface card of a data delivery platform, according to some embodiments. As shown in FIG. 2A, the trusted side network interface card 114 includes one or more input ports 240, one or more output ports 242, a processor 244, an optional network interface 245, and a memory 246. The memory 246 includes a data store 248 storing data 248A (e.g., encoding one or more messages to be transmitted), memory locations 248B, and one or more benchmark values 248C. The memory also includes verification software 249.

Figure 2B:
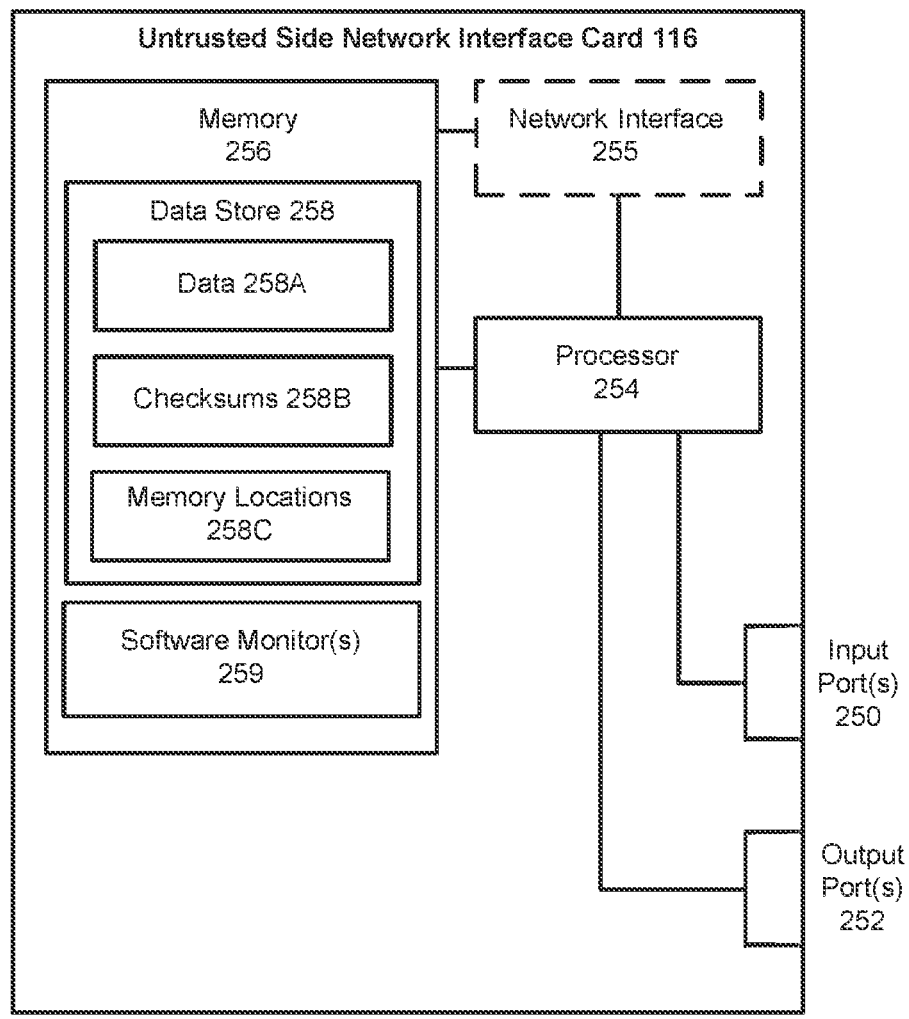
FIG. 2B is a block diagram of an untrusted side network interface card of a data delivery platform, according to some embodiments.

FIG. 2B is a block diagram of an untrusted side network interface card of a data delivery platform, according to some embodiments. The untrusted side network interface card 116 includes one or more input ports 250, one or more output ports 252, a processor 254, an optional network interface 255, and a memory 256. The memory 256 includes a data store 258 storing data 258A (e.g., encoding one or more messages to be transmitted), checksums 258B, and memory locations 258C. The memory also includes one or more software monitors 259.

Figure 3:
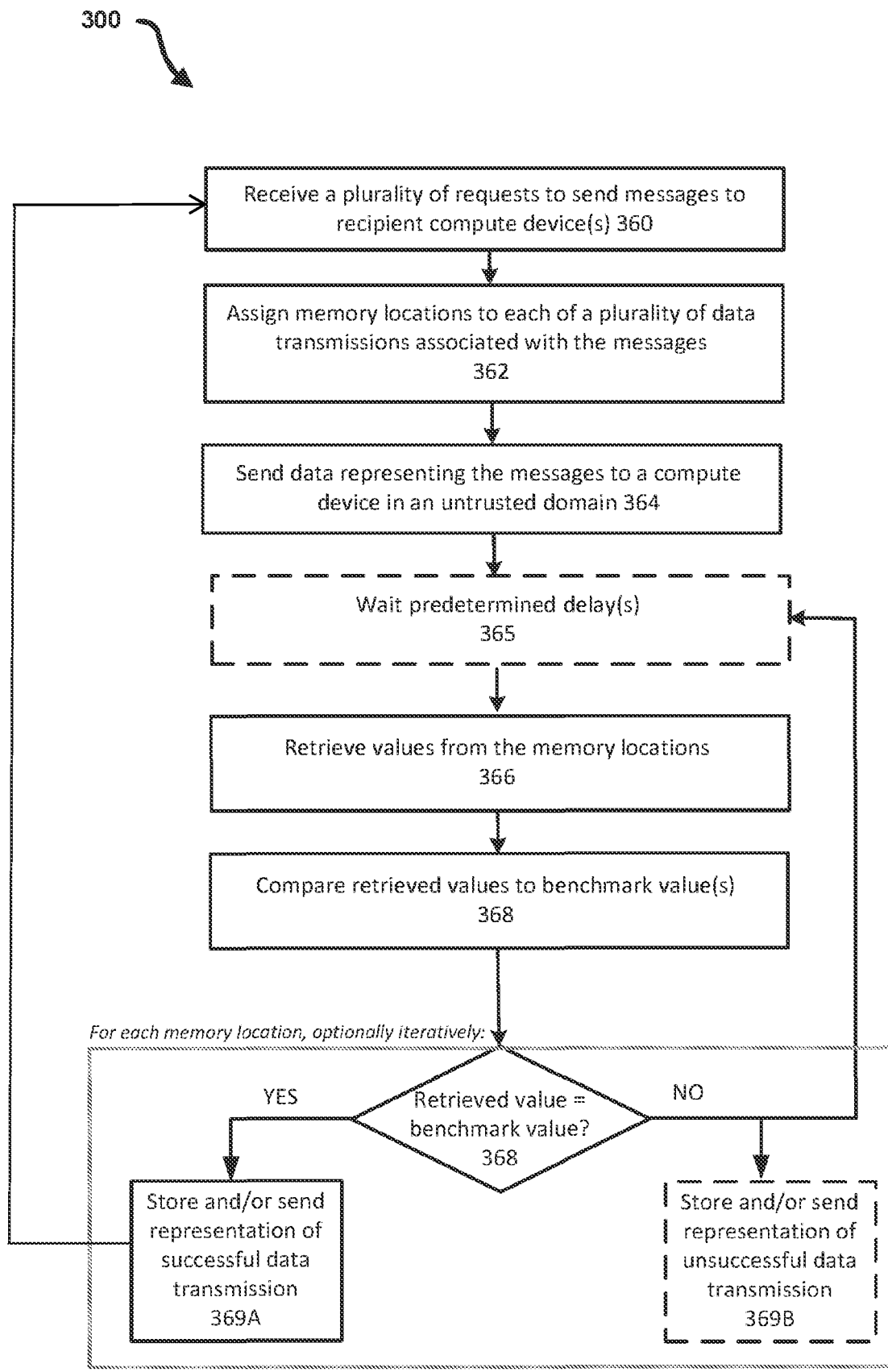
FIG. 3 is a flowchart illustrating a method of unidirectional gateway mediated, multiplexed delivery of data messages, according to some embodiments.

FIG. 3 is a flowchart illustrating a method of unidirectional gateway mediated, multiplexed delivery of data messages, according to some embodiments. As shown in FIG. 3, the method 300 includes receiving, at block 360 and at a processor in a trusted domain, a plurality of requests to send messages to at least one recipient compute device. A plurality of memory locations is assigned, at block 362, to data transmissions (e.g., "virtual" data transmissions) associated with the messages. For example, one memory location may be assigned to each individual data transmission and/or message to be delivered. The memory locations are accessible via the untrusted side network interface card 116 of a compute device in an untrusted domain. Data representing the messages is sent, at block 364 and via the processor, to the compute device in the untrusted domain (e.g., for forwarding to the at least one recipient compute device). After an optional predetermined delay period at block 365, values are retrieved, at block 366, from the memory locations and compared to a predetermined benchmark value at block 368.

Blocks 368 and 369A/369B may be performed iteratively and/or for each memory location from the plurality of memory locations. If, at block 368, the retrieved value is equal to ("matches") the benchmark value, a representation that the data transmission (to an untrusted side network interface card of the data delivery platform) has been successful is stored and/or sent, at block 369A. If, at block 368, the retrieved value is not equal to the benchmark value, a representation that the data transmission (to an untrusted side network interface card of the data delivery platform) has been unsuccessful may be stored and/or sent, at block 369B. Alternatively or in addition, the method 300 can loop back to block 365, to wait an additional predetermined delay period before again retrieving a value from the known memory location (at block 366) and subsequent analysis.

After block 368 and blocks 369A/369B, the method 300 may repeat by returning to block 360 to receive the next request.

The system and methods herein guarantee delivery of data from the originating connection to the destination connection. The originating connection transmits data and waits for a response from the destination connection before proceeding. This response can be either a positive or negative acknowledgement, or, in the case of connection failure, no response at all. The originating connection cannot overrun the destination connection because it is required to wait for a response before proceeding with subsequent data block transmissions.

As described, the definition of a data diode blocks any data or status of any type from the untrusted side to the trusted side. Therefore, the originating trusted connection is unaware of the rate of consumption of data by the destination untrusted connection. If the destination connection is unable to consume data at the rate produced by the originating trusted connection, data overrun may occur, and data will be lost.

Figure 4:
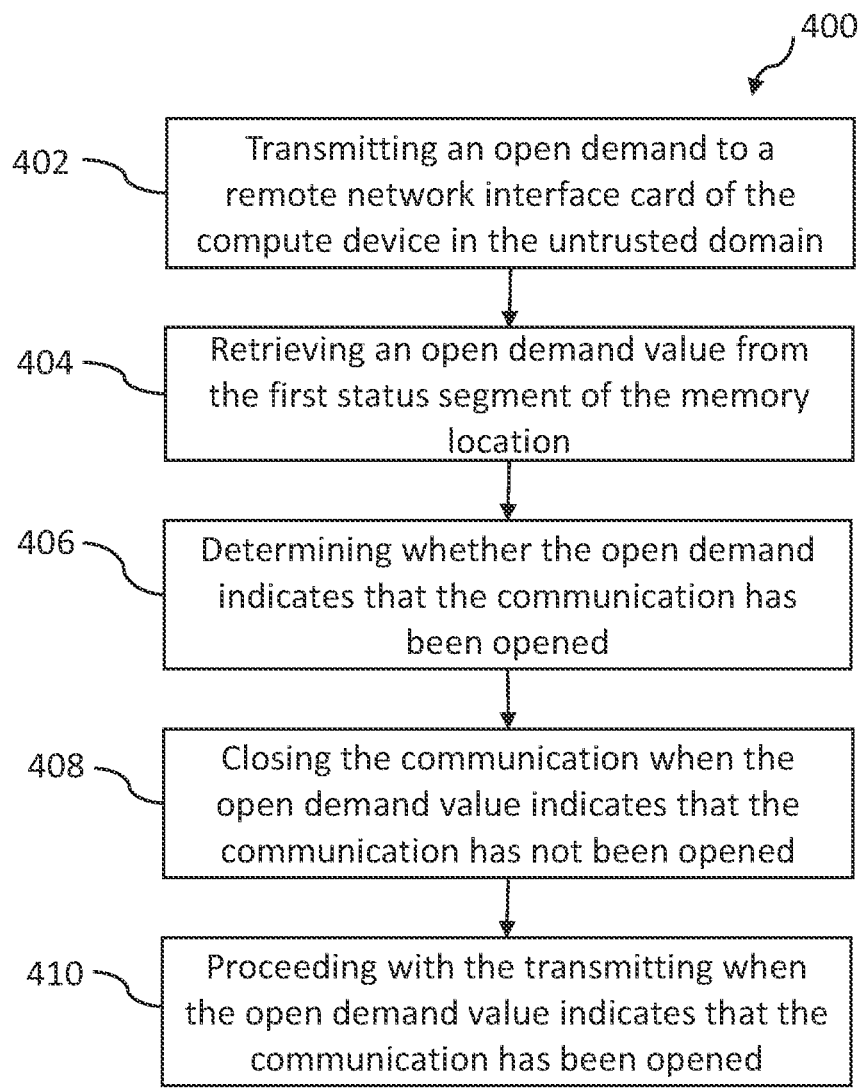
FIG. 4 is a flowchart illustrating a method of requesting a connection between devices in a trusted domain and an untrusted domain, according to some embodiments.

FIG. 4 is a flowchart illustrating a method of requesting a connection between devices in a trusted domain and an untrusted domain, according to some embodiments. The method 400 may use a Transmission Control Protocol (TCP) and includes, at block 402, upon the trusted compute device 112 receiving the first request to send data, transmitting, by the processor, an open demand that is transmitted to the untrusted side network interface card 116 of the untrusted compute device 118 in the untrusted domain 120. The open demand is configured to open communication between the trusted side network interface card 114 in the trusted domain 110 and the untrusted side network interface card 116 in the untrusted domain 120.

Figure 5:
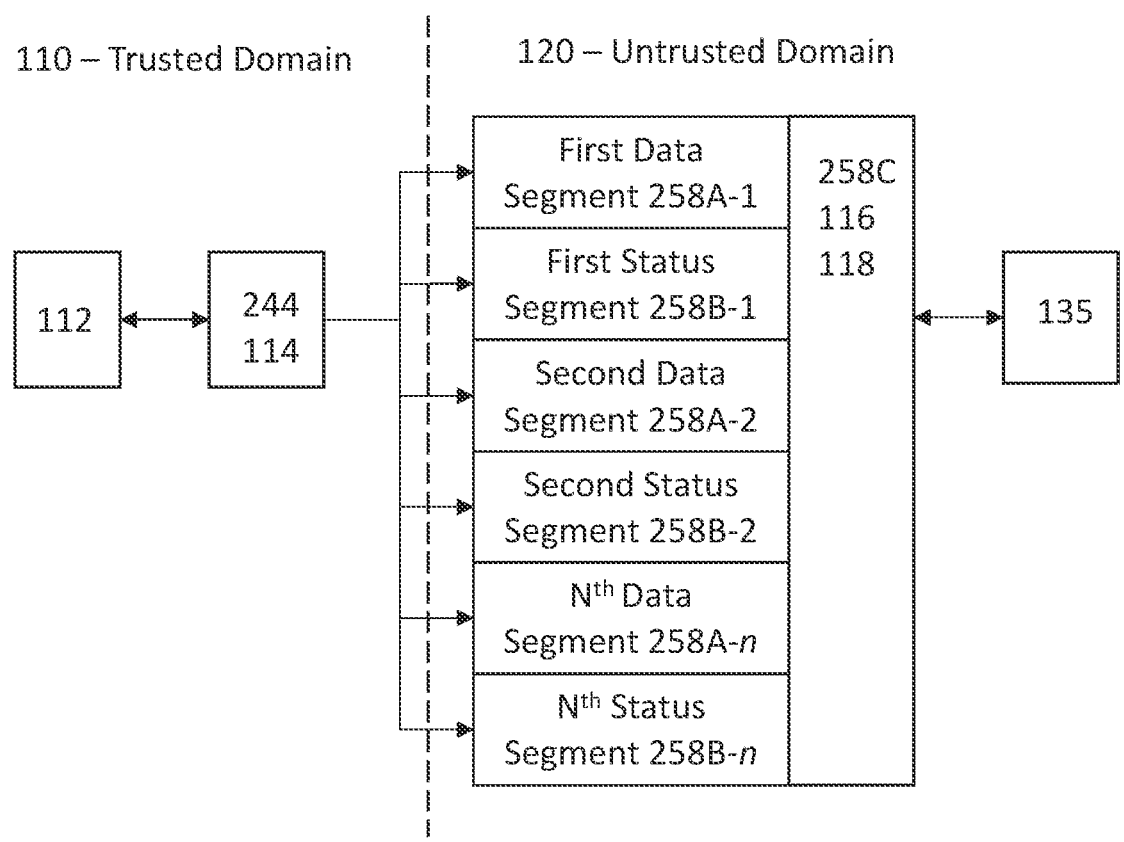
FIG. 5 is a schematic showing the data delivery between the trusted domain and the untrusted domain, according to some embodiments.

FIG. 5 is a schematic showing the data delivery between the trusted domain and the untrusted domain, according to some embodiments. The untrusted side network interface card 116 of the untrusted compute device 118 in the untrusted domain 120 has a memory location 258C. The memory location 258C has a plurality of data segments 258A, such as 258A-1, 258A-2 . . . 258A-n, and a plurality of status segments 258B, such as 258B-1, 258B-2 . . . 258B-n, associated with each message of the plurality of messages. In some embodiments, there are a plurality of memory locations, and each memory location has a data segment and a status segment. The memory location 258C is accessible by the trusted side network interface card 114 and the untrusted side network interface card 116.

Referring to FIGS. 4 and 5, the open demand may be received in the first data segment 258A-1 of a plurality of data segments 258A in a memory location 258C. In response, the untrusted side network interface card 116 of the untrusted compute device 118 attempts to open a TCP connection with the recipient compute device 135 and places an open demand value associated with the open demand in a first status segment 258B-1 of the plurality of status segments 258B of the memory location 258C. At block 404, the processor 244 of the trusted side network interface card 114 retrieves the open demand value associated with the open demand from the first status segment 258B-1 of the plurality of status segments 258B of the memory location 258C. At block 406, the processor 244 determines whether the open demand value indicates that the communication between the trusted domain 110 and the untrusted side network interface card 116 has been opened.

At block 408, when the open demand value indicates that the communication between the trusted domain 110 and the untrusted side network interface card 116 has not been opened, the processor 244 closes the communication between the trusted domain 110 and the untrusted side network interface card 116 of the compute device 118 in the untrusted domain 120. However, at block 410, when the open demand value indicates that the communication between trusted domain 110 and the untrusted side network interface card 116 has been opened, the processor 244 proceeds with the transmitting of the first message of the plurality of messages.

Figure 6:
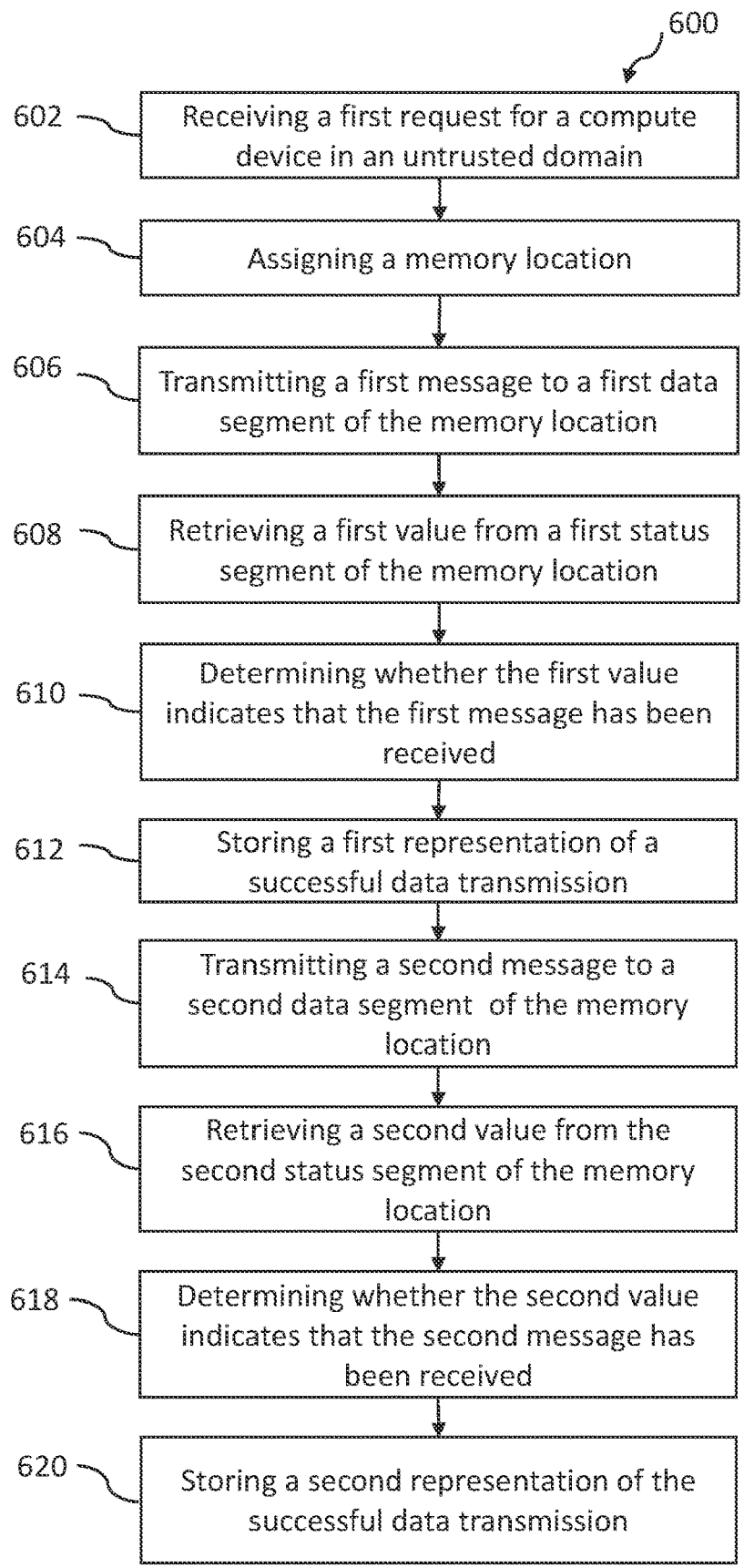
FIG. 6 is a flowchart illustrating a method of transmitting messages between devices in a trusted domain and an untrusted domain, according to some embodiments.

FIG. 6 is a flowchart illustrating a method 600 of transmitting messages between devices in a trusted domain and an untrusted domain, according to some embodiments. The method 600 may be performed by the computerized system 100 including a memory storing executable instructions and a processor coupled to the memory. The processor performs the method 600 by executing the instructions stored in the memory.

Referring to FIGS. 5 and 6, the method 600 includes, at block 602, the processor 244 in the trusted domain 110, receiving a first request having a plurality of messages for a compute device, such as the recipient compute device 135 in an untrusted domain 120. At block 604, the processor 244 assigns a memory location 258C having a plurality of data segments 258A and a plurality of status segments 258B associated with each message of the plurality of messages. The memory location is accessible by an untrusted side network interface card 116 of the compute device 118 in the untrusted domain 120. At block 606, the processor 244 transmits a first message of the plurality of messages to a first data segment 258A-1 of the plurality of data segments 258A of the memory location 258C.

In response, the untrusted side network interface card 116 of the untrusted compute device 118 verifies the integrity of the incoming data using, for example, the series of validity checks of the communications protocol of the data delivery platform. Based on this, the untrusted side network interface card 116 of the untrusted compute device 118 writes a first value associated with the first message of the plurality of messages in a first status segment 258B-1 of the plurality of status segments 258B of the memory location 258C. At block 608, the processor 244 retrieves the first value associated with the first message of the plurality of messages from the first status segment 258B-1 of the plurality of status segments 258B of the memory location 258C. At block 610, the processor 244 determines whether the first value indicates that the first message has been received in the first data segment 258A-1 of the plurality of data segments 258A of the memory location 258C. At block 612, the processor 244 stores a first representation of a successful data transmission when the first value indicates that the first message has been received in the first data segment 258A-1 of the plurality of data segments 258A of the memory location 258C.

At block 614, the processor 244 transmits a second message of the plurality of messages to a second data segment 258A-2 of the plurality of data segments 258A of the memory location 258C. In response, the untrusted side network interface card 116 of the untrusted compute device 118 verifies the integrity of the incoming data using, for example, the series of validity checks of the communications protocol of the data delivery platform. Based on this, the untrusted side network interface card 116 of the untrusted compute device 118 writes a second value associated with the second message of the plurality of messages in a second status segment 258B-2 of the plurality of status segments 258B of the memory location 258C.

At block 616, the processor 244 retrieves the second value associated with the second message of the plurality of messages from the second status segment 258B-2 of the plurality of status segments 258B of the memory location 258C. At block 618, the processor 244 determines whether the second value indicates that the second message has been received in the second data segment 258A-2 of the plurality of data segments 258A of the memory location 258C. At block 620, the processor 244 stores a second representation of a successful data transmission when the second value indicates that the second message has been received in the second data segment 258A-2 of the plurality of data segments 258A of the memory location 258C.

The method repeats in this way until all the plurality of messages are transmitted. The processor 244 closes communication between the trusted domain 110 and the untrusted side network interface card 116 of the compute device 118 in the untrusted domain 120 after all the plurality of messages of the first request are transmitted. During the method 600, the processor 244 may not transmit the next message until it retrieves the value from one of the status segments 258B for the previous message transmission. This serves as a confirmation that the message was successfully or unsuccessfully sent to the recipient compute device 135 and prevents data overrun. At any point during the method 600, the processor 244 may close communication between the trusted domain 110 and the untrusted side network interface card 116 of the compute device 118 in the untrusted domain 120 when the first value or the second value indicates that the first message or the second message has not been received in the first data segment 258A-1 or the second data segment 258A-2 of the plurality of data segments 258A of the memory location 258C. In some embodiments, the processor 244 may refuse receipt of a second request until the plurality of messages of the first request are transmitted, or communication between the trusted domain 110 and the untrusted side network interface card 116 of the compute device 118 in the untrusted domain 120 is closed.

In some embodiments, the processor 244 may wait a predetermined delay period before performing an action, thereby ensuring that a previous action within the untrusted domain 120 had time to complete. For example, the processor 244 may wait a predetermined delay period before retrieving the first value or the second value from the first status segment 258A-1 or the second data segment 258A-2 of the plurality of data segments 258A of the memory location 258C. In some embodiments, the processor 244 may wait a predetermined delay period before accepting a new connection request from a same host when the method 600 is being performed for the plurality of messages. In some embodiments, the processor 244 may wait a predetermined delay period before accepting a new connection request from a same host when the open demand value indicates that the communication between the trusted domain 110 and the untrusted side network interface card 116 has not been opened. In other words, when the processor 244 closes the communication between the trusted domain 110 and the untrusted side network interface card 116 of the compute device 118 in the untrusted domain 120. The predetermined delay period may be up to 600 milliseconds, such as 500 milliseconds.

The value associated with the message from the plurality of status segments 258B of the memory location 258C indicates if the message was successfully or unsuccessfully received in the untrusted domain 120. In some embodiments, the value may be YES/NO logic, SUCCESS/FAIL logic, compared to a benchmark, a recognized key word, a binary code of ones and zeros, or the like.

Figure 7:
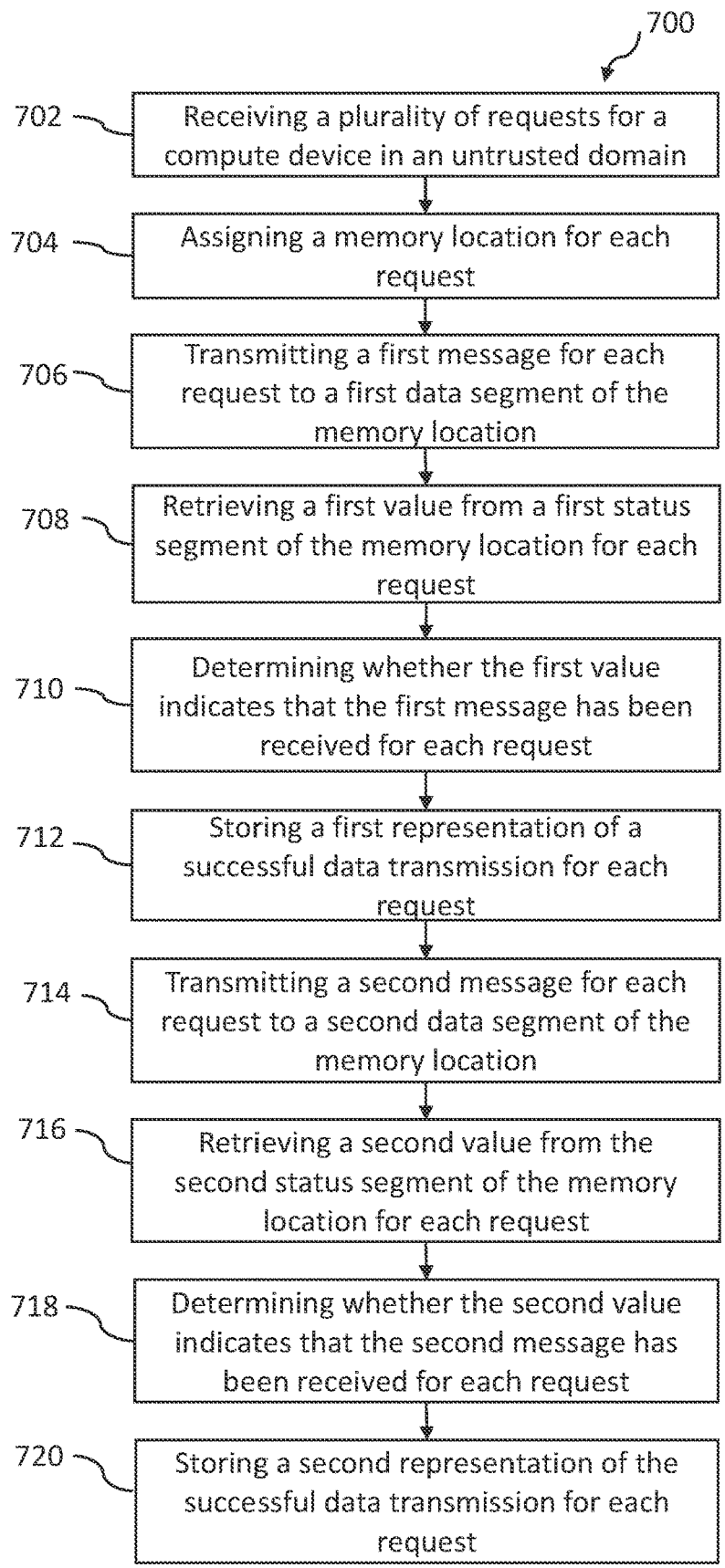
FIG. 7 is a flowchart illustrating a method of transmitting messages concurrently for a plurality of requests between devices in a trusted domain and an untrusted domain, according to some embodiments.

As described herein, in some embodiments, multiplexing of a plurality of requests, each request having a plurality of messages is performed. Concurrent data message streams are assigned a memory location, and programmatically tracking (e.g., using a state table) which memory location corresponds to which ongoing transmission from a trusted side to an untrusted side of a unidirectional gateway of a data delivery platform. FIG. 7 is a flowchart illustrating a method 700 of transmitting messages concurrently for a plurality of requests between devices in a trusted domain and an untrusted domain, according to some embodiments. Method 700 is similar to method 600 as described in FIG. 6 and will not be described in detail.

As shown in FIG. 7, at block 702, the processor receives in a trusted domain, a plurality of requests. Each request of the plurality of requests has a plurality of messages for a compute device in an untrusted domain. At block 704, the processor assigns a memory location of a plurality of memory locations for each request of the plurality of requests. Each memory location of the plurality of memory locations has a plurality of data segments and a plurality of status segments associated with each message of the plurality of messages. Each memory location of the plurality memory locations is accessible by an untrusted side network interface card of the compute device in the untrusted domain. At block 706, the processor transmits a first message of the plurality of messages for each request of the plurality of requests to a first data segment of the plurality of data segments of the memory location domain.

At block 708, the processor retrieves a first value associated with the first message of the plurality of messages from a first status segment of the plurality of status segments of the memory location for each request of the plurality of requests. At block 710, the processor determines whether the first value indicates that the first message of the plurality of messages has been received in the first data segment of the plurality of data segments of the memory location for each request of the plurality of requests. At block 712, the processor stores a first representation of a successful data transmission when the first value indicates that the first message of the plurality of messages has been received in the first data segment of the plurality of data segments of the memory location for each request of the plurality of requests.

At block 714, the processor transmits a second message of the plurality of messages for each request of the plurality of requests to a second data segment of the plurality of data segments of the memory location. At block 716, the processor retrieves a second value associated with the second message of the plurality of messages from the second status segment of the plurality of status segments of the memory location for each request of the plurality of requests. At block 718, the processor determines whether the second value indicates that the second message of the plurality of messages has been received in the second data segment of the plurality of data segments of the memory location for each request of the plurality of requests. At block 720, the processor stores a second representation of the successful data transmission when the second value indicates that the second message of the plurality of messages has been received in the second data segment of the plurality of data segments of the memory location for each request of the plurality of requests.

All combinations of the foregoing concepts and additional concepts discussed herein (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only and are not exhaustive and/or exclusive. Rather, they are presented to assist in understanding and teach the embodiments and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

In the above description, reference numbers have sometimes been used in connection with various terms. Where a term is used in connection with a reference number, this is meant to refer to a specific element that is shown in one or more of the figures. Where a term is used without a reference number, this is meant to refer generally to the term without limitation to any particular figures.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements. The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more blocks or actions for achieving the described methods. The method blocks and/or actions may be interchanged with one another without departing from the scope of the claims. In other words, unless a specific order of blocks or actions is required for proper operation of the method that is being described, the order and/or use of specific blocks and/or actions may be modified without departing from the scope of the claims.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can include instructions, implemented in code, and can be expressed in a variety of software languages (e.g., computer code), including C, C++, Java™, Ruby, Visual Basic™ and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

It is to be understood that the claims are not limited to the precise configuration, data structure, data formats, and/or components illustrated above. Various modifications, changes and variations may be made in the arrangement, operation and details of the systems, methods and apparatus described herein without departing from the scope of the claims.

What is claimed is:

1. A method comprising:
receiving, by a processor in a trusted domain, a first request having a plurality of messages for a compute device in an untrusted domain;
assigning, by the processor, a memory location having a plurality of data segments and a plurality of status segments associated with each message of the plurality of messages, the memory location being accessible by an untrusted side network interface card of the compute device in the untrusted domain;
transmitting, by the processor, a first message of the plurality of messages to a first data segment of the plurality of data segments of the memory location;
retrieving, by the processor, a first value associated with the first message of the plurality of messages from a first status segment of the plurality of status segments of the memory location;

determining, by the processor, whether the first value indicates that the first message of the plurality of messages has been received in the first data segment of the plurality of data segments of the memory location;
storing, by the processor, a first representation of a successful data transmission when the first value indicates that the first message of the plurality of messages has been received in the first data segment of the plurality of data segments of the memory location;
transmitting, by the processor, a second message of the plurality of messages to a second data segment of the plurality of data segments of the memory location;
retrieving, by the processor, a second value associated with the second message of the plurality of messages from a second status segment of the plurality of status segments of the memory location;
determining, by the processor, whether the second value indicates that the second message of the plurality of messages has been received in the second data segment of the plurality of data segments of the memory location; and
storing, by the processor, a second representation of the successful data transmission when the second value indicates that the second message of the plurality of messages has been received in the second data segment of the plurality of data segments of the memory location.

2. The method of claim 1, further comprising:
closing, by the processor, communication between the trusted domain and the untrusted side network interface card of the compute device in the untrusted domain when the first value or the second value indicates that the first message or the second message has not been received in the first data segment or the second data segment of the plurality of data segments of the memory location.

3. The method of claim 1, further comprising:
upon receiving the first request, transmitting, by the processor, an open demand to the untrusted side network interface card of the compute device in the untrusted domain, the open demand configured to open communication between the trusted domain and the untrusted side network interface card;
retrieving, by the processor, an open demand value associated with the open demand from the first status segment of the plurality of status segments of the memory location;
determining, by the processor, whether the open demand indicates that the communication between the trusted domain and the untrusted side network interface card has been opened;
closing, by the processor, the communication between the trusted domain and the untrusted side network interface card of the compute device in the untrusted domain when the open demand value indicates that the communication between the trusted domain and the untrusted side network interface card has not been opened; and
proceeding with the transmitting, by the processor, of the first message of the plurality of messages when the open demand value indicates that the communication between the trusted domain and the untrusted side network interface card has been opened.

4. The method of claim 1, further comprising:
waiting, by the processor, a predetermined delay period before retrieving the first value or the second value from the first status segment or the second status segment of the plurality of status segments of the memory location, wherein the predetermined delay period is up to 600 milliseconds.

5. The method of claim 1, wherein communication between the processor and the untrusted side network interface card of the compute device in the untrusted domain is a unidirectional non-networked connection.

6. The method of claim 1, wherein the processor and the untrusted side network interface card of the compute device in the untrusted domain are directly physically connected with only a single cable therebetween.

7. The method of claim 1, further comprising:
closing, by the processor, communication between the trusted domain and the untrusted side network interface card of the compute device in the untrusted domain after the plurality of messages of the first request are transmitted.

8. The method of claim 1 further comprising:
refusing, by the processor, receipt of a second request until the plurality of messages of the first request are transmitted, or communication between the trusted domain and the untrusted side network interface card of the compute device in the untrusted domain is closed.

9. The method of claim 1 further comprising:
transmitting, by the processor, the second message of the plurality of messages only when the first value indicates that the first message of the plurality of messages has been received in the first data segment of the plurality of data segments of the memory location.

10. A method, comprising:
receiving, by a processor in a trusted domain, a plurality of requests, each request having a plurality of messages for a compute device in an untrusted domain;
assigning, by the processor, a memory location of a plurality of memory locations for each request of the plurality of requests, each memory location of the plurality of memory locations having a plurality of data segments and a plurality of status segments associated with each message of the plurality of messages, each memory location of the plurality memory locations being accessible by an untrusted side network interface card of the compute device in the untrusted domain;
transmitting, by the processor, a first message of the plurality of messages for each request of the plurality of requests to a first data segment of the plurality of data segments of a memory location domain;
retrieving, by the processor, a first value associated with the first message of the plurality of messages from a first status segment of the plurality of status segments of the memory location for each request of the plurality of requests;
determining, by the processor, whether the first value indicates that the first message of the plurality of messages has been received in the first data segment of the plurality of data segments of the memory location for each request of the plurality of requests;
storing, by the processor, a first representation of a successful data transmission when the first value indicates that the first message of the plurality of messages has been received in the first data segment of the plurality of data segments of the memory location for each request of the plurality of requests;
transmitting, by the processor, a second message of the plurality of messages for each request of the plurality of requests to a second data segment of the plurality of data segments of the memory location;

retrieving, by the processor, a second value associated with the second message of the plurality of messages from a second status segment of the plurality of status segments of the memory location for each request of the plurality of requests;

determining, by the processor, whether the second value indicates that the second message of the plurality of messages has been received in the second data segment of the plurality of data segments of the memory location for each request of the plurality of requests; and storing, by the processor, a second representation of the successful data transmission when the second value indicates that the second message of the plurality of messages has been received in the second data segment of the plurality of data segments of the memory location for each request of the plurality of requests.

11. The method of claim 10, further comprising:

closing, by the processor, communication between the trusted domain and the untrusted side network interface card of the compute device in the untrusted domain for each request of the plurality of requests, when the first value or the second value indicates that the first message or the second message has not been received in the first data segment or the second data segment of the plurality of data segments of the memory location.

12. The method of claim 10, further comprising:

upon receiving the request, transmitting, by the processor, an open demand to the untrusted side network interface card of the compute device in the untrusted domain for each request of the plurality of requests, the open demand configured to open communication between the trusted domain and the untrusted side network interface card;

retrieving, by the processor, an open demand value associated with the open demand from the first status segment of the memory location for each request of the plurality of requests;

determining, by the processor, whether the open demand indicates that the communication between the trusted domain and the untrusted side network interface card has been opened for each request of the plurality of requests;

closing, by the processor, the communication between the trusted domain and the untrusted side network interface card of the compute device in the untrusted domain for each request of the plurality of requests, when the open demand value indicates that the communication between the trusted domain and the untrusted side network interface card has not been opened; and proceeding with the transmitting, by the processor, of data representing the plurality of messages for each request of the plurality of requests when the open demand value indicates that the communication between the trusted domain and the untrusted side network interface card has been opened.

13. The method of claim 10, further comprising:

waiting, by the processor, a predetermined delay period before retrieving the first value from the first status segment of the memory location of the plurality of memory locations for each request of the plurality of requests, wherein the predetermined delay period is up to 600 milliseconds.

14. The method of claim 10, wherein communication between the processor and the untrusted side network interface card of the compute device in the untrusted domain is a unidirectional non-networked connection.

15. The method of claim 10, wherein the processor and the untrusted side network interface card of the compute device in the untrusted domain are directly physically connected with only a single cable therebetween.

16. The method of claim 10, further comprising:

closing, by the processor, communication between the trusted domain and the untrusted side network interface card of the compute device in the untrusted domain for each request of the plurality of requests, after the plurality of messages of the request are transmitted.

17. A computerized system comprising:

a memory storing executable instructions; and a processor, coupled to the memory, that performs a method by executing the instructions stored in the memory, the method comprising:

receiving, at the processor in a trusted domain, a first request having a plurality of messages for a compute device in an untrusted domain;

assigning, by the processor, a memory location having a plurality of data segments and a plurality of status segments associated with each message of the plurality of messages, the memory location being accessible by an untrusted side network interface card of the compute device in the untrusted domain;

transmitting, by the processor, a first message of the plurality of messages to a first data segment of the plurality of data segments of the memory location;

retrieving, by the processor, a first value associated with the first message of the plurality of messages from a first status segment of the plurality of status segments of the memory location;

determining, by the processor, whether the first value indicates that the first message has been received in the first data segment of the plurality of data segments of the memory location;

storing, by the processor, a first representation of a successful data transmission when the first value indicates that the first message has been received in the first data segment of the plurality of data segments of the memory location;

transmitting, by the processor, a second message of the plurality of messages to a second data segment of the plurality of data segments of the memory location;

retrieving, by the processor, a second value associated with the second message of the plurality of messages from a second status segment of the plurality of status segments of the memory location;

determining, by the processor, whether the second value indicates that the second message has been received in the second data segment of the plurality of data segments of the memory location; and storing, by the processor, a second representation of the successful data transmission when the second value indicates that the second message has been received in the second data segment of the plurality of data segments of the memory location.

18. The computerized system of claim 17, wherein communication between the processor and the untrusted side network interface card of the compute device in the untrusted domain is a unidirectional non-networked connection.

19. The computerized system of claim 17, wherein the processor and the untrusted side network interface card of the compute device in the untrusted domain are directly physically connected with only a single cable therebetween.

20. The computerized system of claim 17, wherein the processor closes communication between the trusted domain and the untrusted side network interface card of the compute device in the untrusted domain when the first value or the second value indicates that the first message or the second message has not been received in the first data segment or the second data segment of the plurality of data segments of the memory location.

\* \* \* \* \*